United States Patent
Katayama

(10) Patent No.: US 9,258,028 B2
(45) Date of Patent: Feb. 9, 2016

(54) SPECTACLE-TYPE WIRELESS COMMUNICATOR

(71) Applicant: SHARP KABUSHIKI KAISHA, Osaka-shi, Osaka (JP)

(72) Inventor: Tomofumi Katayama, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 120 days.

(21) Appl. No.: 14/351,186

(22) PCT Filed: Oct. 18, 2012

(86) PCT No.: PCT/JP2012/076950
§ 371 (c)(1),
(2) Date: Apr. 11, 2014

(87) PCT Pub. No.: WO2013/065496
PCT Pub. Date: May 10, 2013

(65) Prior Publication Data
US 2014/0273893 A1    Sep. 18, 2014

(30) Foreign Application Priority Data
Nov. 4, 2011   (JP) ................. 2011-242836

(51) Int. Cl.
| H01Q 1/44 | (2006.01) |
| H04M 1/05 | (2006.01) |
| H04B 1/3827 | (2015.01) |
| H04N 5/64 | (2006.01) |
| G02C 11/00 | (2006.01) |
| H01Q 1/27 | (2006.01) |

(Continued)

(52) U.S. Cl.
CPC ............... *H04B 1/385* (2013.01); *G02C 11/10* (2013.01); *H01Q 1/273* (2013.01); *H01Q 1/44* (2013.01); *H04N 5/64* (2013.01); *H04B 2001/3866* (2013.01); *H04N 21/4122* (2013.01); *H04N 21/43637* (2013.01)

(58) Field of Classification Search
CPC ......... G02C 11/10; H01Q 1/273; H01Q 1/44; H04B 1/385; H04B 2001/3866
See application file for complete search history.

(56) References Cited

U.S. PATENT DOCUMENTS

| 2002/0118464 A1 | 8/2002 | Nishioka et al. |
| 2005/0136977 A1* | 6/2005 | Levy ........... H04B 1/385 455/557 |

(Continued)

FOREIGN PATENT DOCUMENTS

| CN | 101512916 A | 8/2009 |
| DE | 10118597 A1 | 11/2002 |

(Continued)

Primary Examiner — Bobbak Safaipour
Assistant Examiner — Devan Sandiford
(74) Attorney, Agent, or Firm — Birch, Stewart, Kolasch & Birch, LLP

(57) ABSTRACT

A glasses-type radio communication device (1) to be worn on the head of a user includes: left and right eyepiece parts (11), temples (14), an antenna (100) for carrying out a radio communication, hinges (17) each provided for folding each of the temples (14) towards a corresponding one of the eyepiece parts (11), while one of the temples (14) being folded towards a corresponding one of the eyepiece parts (11), the temple (14) having a shape in which the temple curves so as to be away from the antenna (100) provided in an outer edge region along an outer edge of the eyepiece part (11).

8 Claims, 7 Drawing Sheets

(51) Int. Cl.
*H04N 21/41* (2011.01)
*H04N 21/4363* (2011.01)

(56) References Cited

U.S. PATENT DOCUMENTS

| | | | | |
|---|---|---|---|---|
| 2007/0063901 | A1* | 3/2007 | Tang | H01Q 9/40 343/702 |
| 2008/0055537 | A1* | 3/2008 | Asrani | H01Q 1/273 351/41 |
| 2012/0002159 | A1* | 1/2012 | Blum | G02C 7/081 351/113 |
| 2012/0068895 | A1* | 3/2012 | Yamaguchi | H01Q 1/2266 343/702 |
| 2012/0169990 | A1* | 7/2012 | Burnstein | A43B 1/0054 351/115 |
| 2014/0159969 | A1* | 6/2014 | Israel | H01Q 1/38 343/718 |
| 2014/0194078 | A1* | 7/2014 | Hikino | G02C 11/10 455/90.2 |
| 2014/0240474 | A1* | 8/2014 | Kondo | H01Q 9/16 348/56 |

FOREIGN PATENT DOCUMENTS

| | | |
|---|---|---|
| JP | 2002-214545 A | 7/2002 |
| JP | 2004-320597 A | 11/2004 |
| WO | 2009/157605 A1 | 12/2009 |

* cited by examiner

SPECTACLE-TYPE WIRELESS COMMUNICATOR

TECHNICAL FIELD

The present invention relates to a glasses-type radio communication device.

BACKGROUND ART

In recent years, it has been developed an electronic device having an appearance of glasses such as (i) 3D glasses for watching 3D television, (ii) 3D glasses for enjoying 3D game, or (iii) a glasses-type head mount display. Such an electronic device may include an antenna so as to carry out radio communication.

Examples of a conventional glasses-type radio communication device, having an antenna, encompass a device in which an antenna is provided in a frame of glasses (see, for example, Patent Literature 1). For example, Patent Literature 1 discloses a pair of variable-focal length glasses in which an antenna is provided in its frame.

CITATION LIST

Patent Literature

[Patent Literature 1]
Japanese Patent Application Publication, Tokukai, No. 2002-214545 A (Publication Date: Jul. 31, 2002)

SUMMARY OF INVENTION

Technical Problem

However, according to a conventional glasses-type radio communication device, its antenna characteristics may deteriorate when the radio communication device is closed (folded).

FIG. 9 is a view illustrating an example of how antennas are provided in a conventional radio communication device. (a) of FIG. 9 is a perspective view illustrating a state (opening state) of the radio communication device which is in an opening state (a state in which a first antenna 91 and a second antenna 92 are away from each other). (b) of FIG. 9 is a top view of the radio communication device illustrated in (a) of FIG. 9. (c) of FIG. 9 is a perspective view illustrating a state (folded state) of the radio communication device which is in a folded state (a state in which the first antenna 91 and the second antenna 92 are close to each other). (d) of FIG. 9 is a top view of the radio communication device illustrated in (c) of FIG. 9.

According to the radio communication device, the first antenna 91 and the second antenna 92 are connected to each other, via a power feed line 93 (see (a) and (b) of FIG. 9). In a case where a radio communication is carried out while the radio communication device is being folded at the power feed line 93 such that the first antenna 91 and the second antenna 92 are close to each other (see (c) and (d) of FIG. 9), the first antenna 91 and the second antenna 92 are capacitively coupled to each other.

The capacitive coupling of the first antenna 91 and the second antenna 92 in a folded state may cause antenna characteristics of the first antenna 91 and the second antenna 92 to move (shift) towards a frequency band lower or higher than a frequency band in an opening state. This causes a problem that good characteristics cannot be obtained, during a folded state, in a use frequency band of the antennas, and ultimately causes a deterioration in antenna characteristics.

The problem will be further discussed below with reference to FIG. 10. FIG. 10 illustrates an example of how antennas are arranged in a conventional glasses-type radio communication device. (a) of FIG. 10 is a side view of a glasses-type radio communication device in a case where it is in an opening state (opening state) (temples 14 and respective rims 12 are away from each other). (b) of FIG. 10 is a top view of the glasses-type radio communication device in the opening state. (c) of FIG. 10 is a side view of the glasses-type radio communication device in a case where it is in a folded state (folded state) (the temples 14 and the respective rims 12 are close to each other). (d) is a top view of the glasses-type radio communication device in the folded state. Note that, for convenience, the rims 12 are not illustrated in (b) of FIG. 10 and (d) of FIG. 10. As illustrated in (b) and (d) of FIG. 10, the glasses-type radio communication device includes a first antenna 94 and a second antenna 95, like the radio communication device illustrated in FIG. 9. The first antenna 94 is provided in a rim 12 on a right side and the second antenna 95 is provided in a temple 14 on a right side. The first antenna 94 and the second antenna 95 are electrically connected with each other, via an endpiece 16 and a hinge 17. Note that the endpiece 16 and the hinge 17 do not have to electrically connect the first antenna 94 and the second antenna 95. Note also that it is only necessary that one of the first antenna 94 and the second antenna 95 is included. In this case, it is preferable that one of the rim 12 and the temple 14 in which one no first antenna 94 or no second antenna 95 is provided, is made of an electric conductor such as a metal.

In a case where a radio communication is carried out while the glasses-type radio communication device is being folded (see (c) and (d) of FIG. 10), the first antenna 94 and the second antenna 95, like the radio communication device of FIG. 9, interfere with each other and are capacitively coupled with each other. This causes antenna characteristics of each of the first antenna 94 and the second antenna 95 to shift towards a frequency band lower or higher than a frequency band in an opening state. Therefore, good characteristics cannot be obtained in the use frequency bands of the respective antennas.

The deterioration in antenna characteristics will be further discussed below with reference to (d) of FIG. 10. In a case where the first antenna 94 and the second antenna 95 are located linearly and in parallel to each other, capacitive coupling occurs and an amount of such capacitive coupling is proportional to the product of a capacity coefficient C and a voltage, provided that an electric field generated between the first antenna 94 and the second antenna 95 is uniform. The capacity coefficient C is represented by the following equation:

$$C = \in 0 \times L \times A/D \qquad (1)$$

where L is a length of an overlapping part in which the first antenna 94 and the second antenna 95 overlap in a folded state (amount of overlapping of the first and second antennas 94 and 95 in an X axis direction), A is a width of the overlapping part (amount of the overlapping in a Z axis direction), D is a distance between the temple 14 and the rim 12, and $\in 0$ is a dielectric constant in a vacuum.

Note that, since the distance D between the temple 14 and the rim 12 in the equation (1) is equal to a depth T of the endpiece 16 (a length in Y axis direction), D=T. Note also that, since a distance W between an end cover 15 and the rim 12 in a folded state is determined by a depth of the endpiece 16, W=T.

Since the voltage is constant, the amount of capacitive coupling between the first antenna 94 and the second antenna 95 changes in accordance with a change in the capacity coefficient C shown in the equation (1). Accordingly, as the capacity coefficient C increases, the amount of capacitive coupling between the first antenna 94 and the second antenna 95 increases. The increase in the amount of capacitive coupling causes antenna characteristics of each of the first antenna 94 and the second antenna 95 to shift towards a frequency band lower or higher than a frequency band in an opening state. Therefore, good characteristics cannot be obtained in the use frequency bands of the respective antennas.

The present invention has been made in view of the above problem, and a main object of the present invention is to provide a glasses-type radio communication device having good antenna characteristics in a folded state.

Solution to Problem

In order to attain the object, a glasses-type radio communication device of the present invention is a glasses-type radio communication device to be worn on the head of a user, including: left and right eyepiece parts; temples each provided to be hooked on the ears of the user; an antenna(s) for carrying out a radio communication; and hinges each provided for folding each of the temples towards a corresponding one of the eyepiece parts, either (i) an antenna being provided in an outer edge region along an outer edge of one of the eyepiece parts and an antenna being provided in a corresponding one of the temples or (ii) an antenna being provided in one of (a) the outer edge region along the outer edge of the eyepiece part and (b) the temple, whereas an electric conductor being provided in the other, while the temple is being folded towards the eyepiece part, the temple having a shape in which the temple curves so as to be away from the antenna or the electric conductor provided in the outer edge region.

Advantageous Effects of Invention

A glasses-type radio communication device of the present invention is a glasses-type radio communication device to be worn on the head of a user, including: left and right eyepiece parts; temples each provided to be hooked on the ears of the user; an antenna(s) for carrying out a radio communication; and hinges each provided for folding each of the temples towards a corresponding one of the eyepiece parts, either (i) an antenna being provided in an outer edge region along an outer edge of one of the eyepiece parts and an antenna being provided in a corresponding one of the temples or (ii) an antenna being provided in one of (a) the outer edge region along the outer edge of the eyepiece part and (b) the temple, whereas an electric conductor being provided in the other, while the temple is being folded towards the eyepiece part, the temple having a shape in which the temple curves so as to be away from the antenna or the electric conductor provided in the outer edge region.

It is therefore possible to prevent, while the temple is being folded towards the eyepiece part, a deterioration in antenna characteristics in a use frequency band of the antenna(s) of the glasses-type radio communication device.

Figure 2:
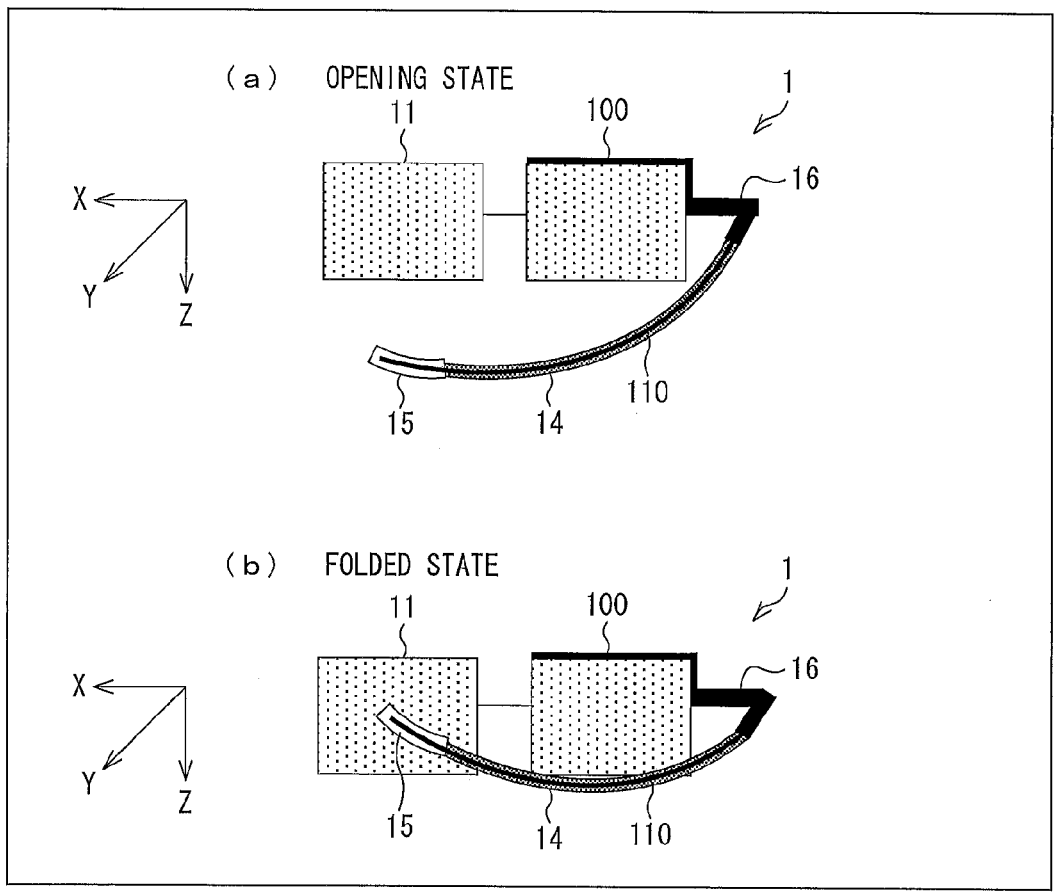

(a) of FIG. 2 is a perspective view illustrating a glasses-type radio communication device in an opening state. (b) of FIG. 2 is a perspective view illustrating the glasses-type radio communication device in a folded state.

Figure 3:
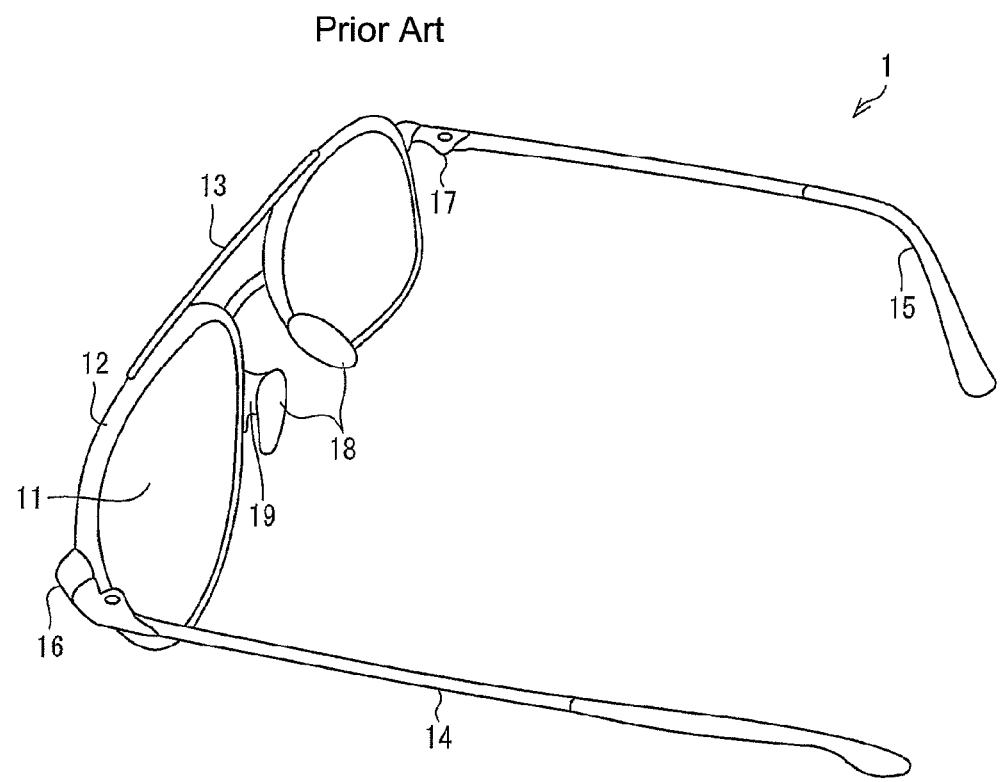

FIG. 3 is a schematic view illustrating an eyeglasses-type radio communication device.

Figure 4:
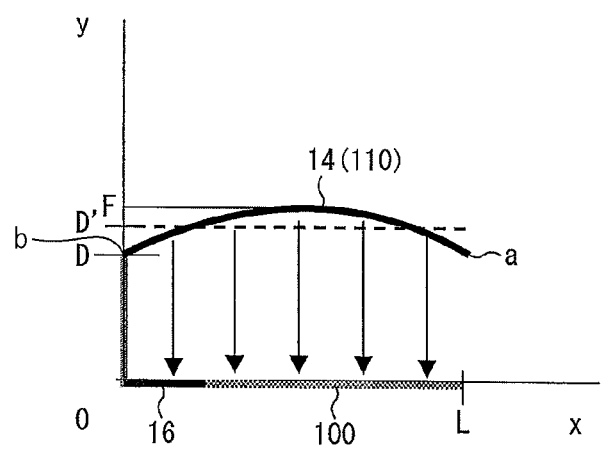

FIG. 4 is an XY plan view of a glasses-type radio communication device.

Figure 5:
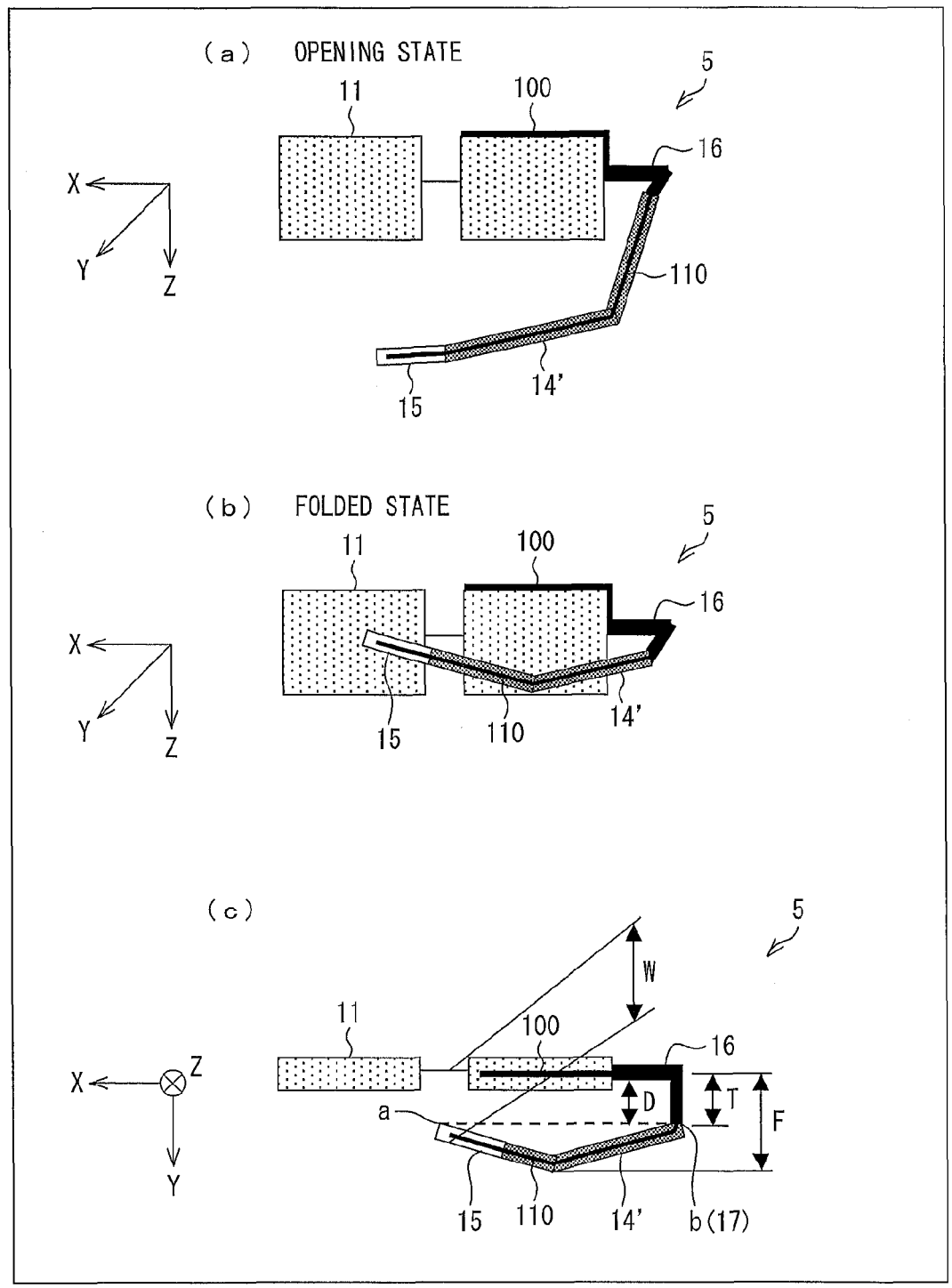

FIG. 5 is a view illustrating a modification of a configuration of a glasses-type radio communication device. (a) of FIG. 5 is a perspective view illustrating the glasses-type radio communication device in an opening state. (b) of FIG. 5 is a perspective view illustrating the glasses-type radio communication device in a folded state. (c) of FIG. 5 is a top view illustrating the glasses-type radio communication device in a folded state.

Figure 6:
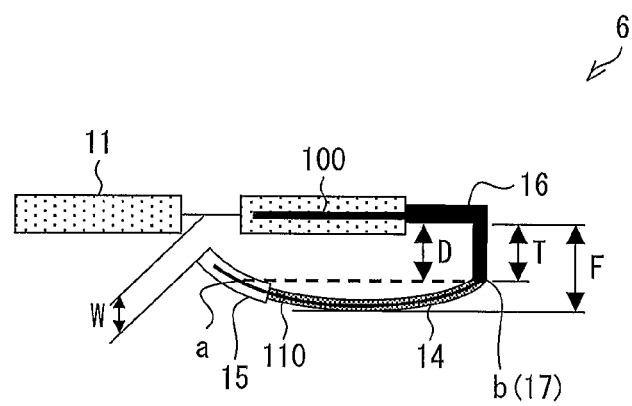

FIG. 6 is a top view illustrating another modification of a configuration of a glasses-type radio communication device.

Figure 7:
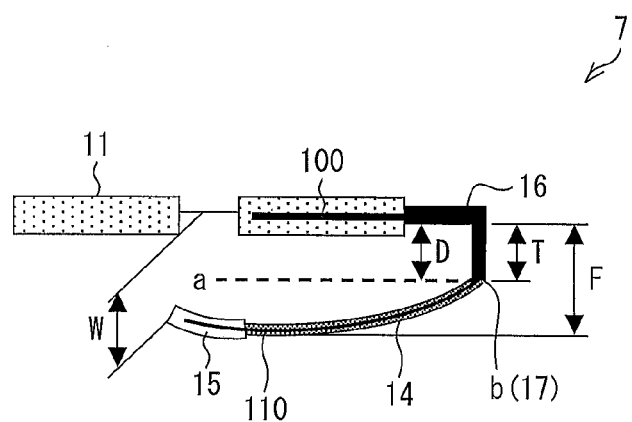

FIG. 7 is a top view illustrating a further modification of a configuration of a glasses-type radio communication device.

Figure 8:
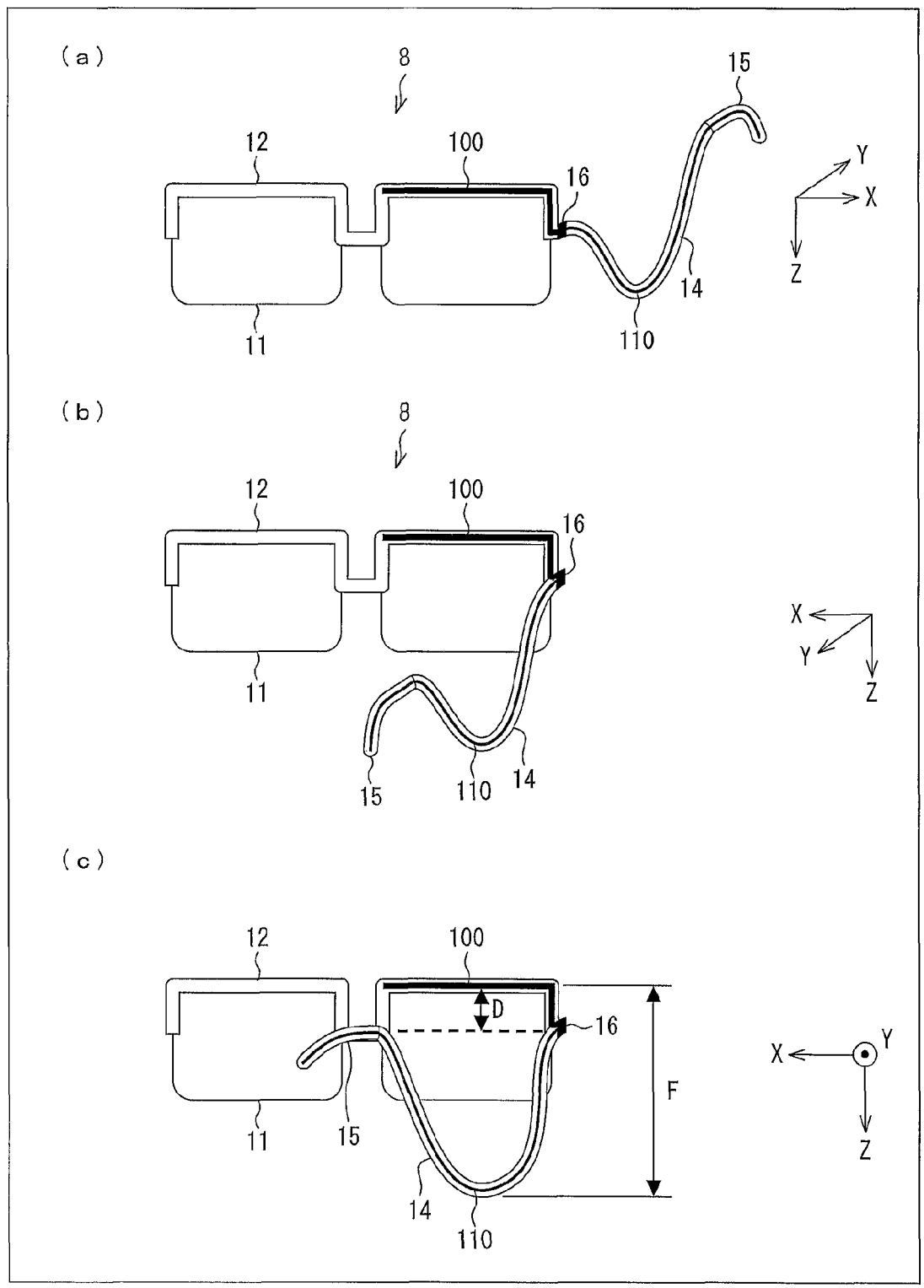

FIG. 8 is a view illustrating still a further modification of a configuration of a glasses-type radio communication device. (a) of FIG. 8 is a front perspective view illustrating the glasses-type radio communication device in an opening state. (b) of FIG. 8 is a rear perspective view illustrating the glasses-type radio communication device in an opening state. (c) of FIG. 8 is a view illustrating the glasses-type radio communication device in a folded state seen from a user.

Figure 9:
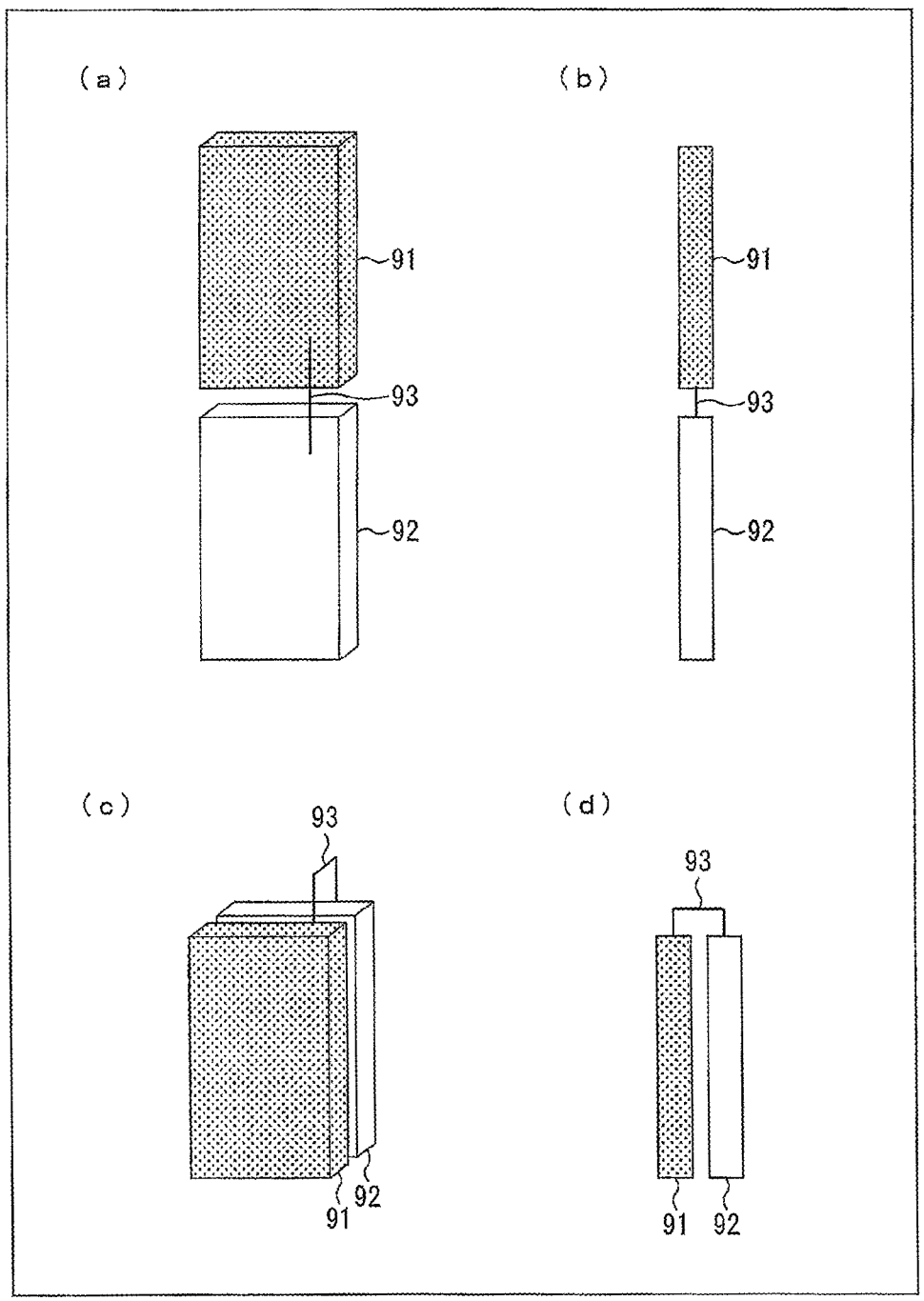

FIG. 9 is a view illustrating an example of a configuration of a conventional radio communication device. (a) of FIG. 9 is a perspective view illustrating the conventional radio communication device in an opening state. (b) of FIG. 9 is a top view illustrating the conventional radio communication device in an opening state. (c) of FIG. 9 is a perspective view illustrating the conventional radio communication device in a folded state. (d) of FIG. 9 is a top view illustrating the conventional radio communication device in a folded state.

Figure 10:
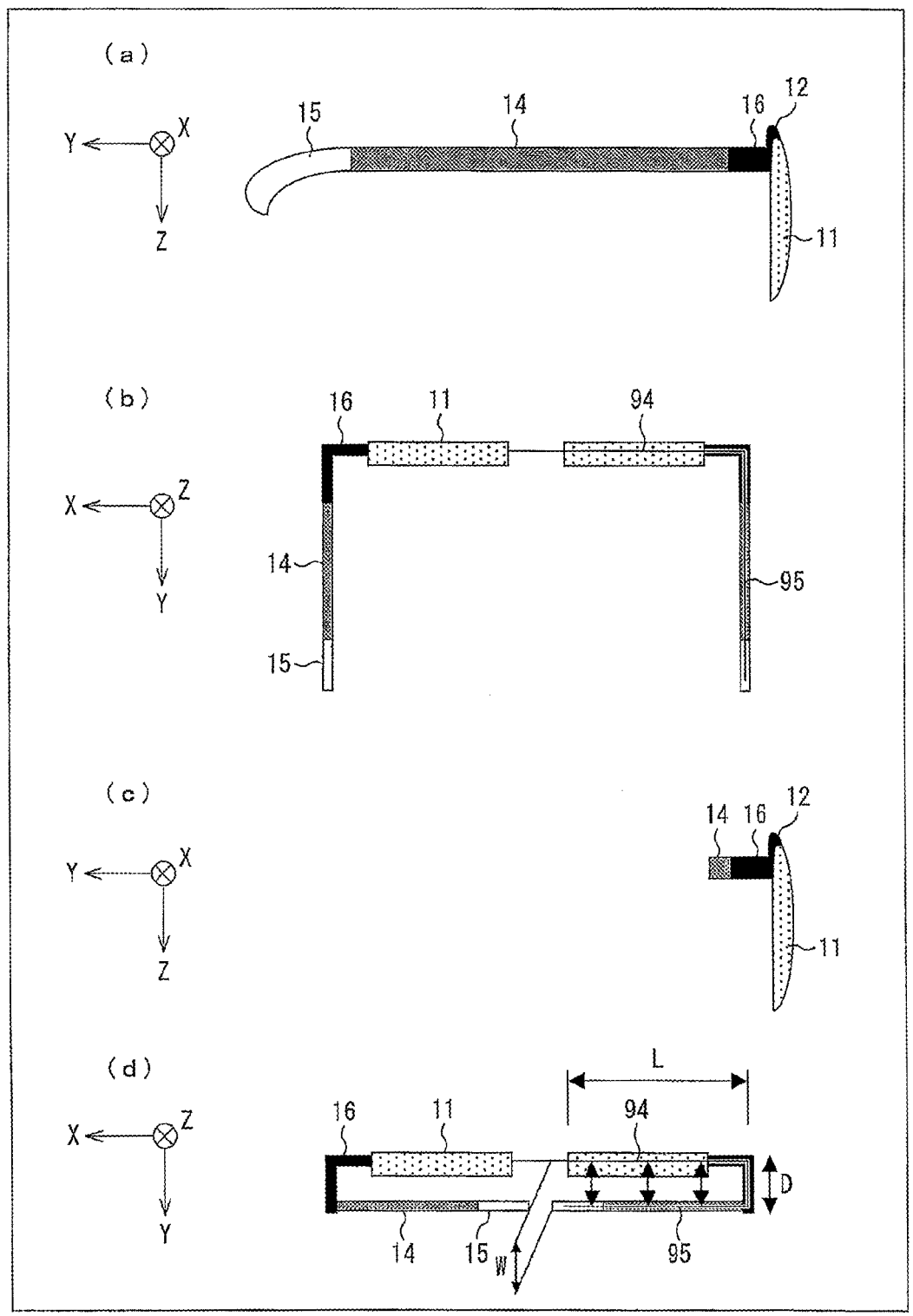

FIG. 10 is a view illustrating another example of a configuration of a conventional glasses-type radio communication device. (a) of FIG. 10 is a side view illustrating the conventional glasses-type radio communication device in an opening state. (b) of FIG. 10 is a top view illustrating the conventional glasses-type radio communication device in an opening state. (c) of FIG. 10 is a side view illustrating the conventional glasses-type radio communication device in a folded state. (d) of FIG. 10 is a top view illustrating the conventional glasses-type radio communication device in a folded state.

DESCRIPTION OF EMBODIMENTS

The following description will discuss, in detail, embodiments of the present invention. A glasses-type radio communication device of the present invention has an appearance of glasses and is to be worn on the head of a user. The glasses-type radio communication device of the present invention is not limited to a particular one, provided that it carries out a radio communication. The glasses-type radio communication device of the present invention is applicable to various uses such as 3D glasses, a head mount display, a headset, a radio receiver, and a personal identification device.

Embodiment 1

An embodiment (Embodiment 1) of the present invention will be described below with reference to FIGS. 1 through 7.

(Outline of Glasses-Type Radio Communication Device 1)

The following description will first discuss an outline of a glasses-type radio communication device 1 in accordance with Embodiment 1 with reference to FIG. 3. FIG. 3 is a schematic view illustrating the glasses-type radio communication device 1 of Embodiment 1. As illustrated in FIG. 3, the glasses-type radio communication device 1 has an appearance of glasses and includes eyepiece parts 11, rims 12, a bridge 13, temples 14, end covers 15, endpieces 16, hinges 17, pads 18, and pad arms 19.

The eyepiece parts 11 are optical elements to be provided in front of respective right and left eyes. Examples of the eyepiece parts 11 encompass glasses-type lenses. The eyepiece parts 11 may be incorporated into a display for displaying images, such as an LCD (liquid crystal display) or a retinal scanning display.

The rims 12 are holding members that surround and hold the respective eyepiece parts 11. The rims 12 do not necessarily have to entirely protect the outer edges of the respective eyepiece parts 11. As such, the rims 12 may protect substantially half or part of the respective outer edges of the eyepiece sections 11. Furthermore, the glasses-type radio communication device 1 does not necessarily have to include the rims 12.

The bridge 13 is a connecting member for making a connection between the right and left eyepiece parts 11. The bridge 13 connects, via the rims 12 or directly, the right and left eyepiece parts 11 such that the eyepiece parts 11 are located in respective predetermined positions.

Each of the temples 14 is a member including an ear-hook and is also called an earpiece. According to some temples 14, a part, which is in contact with a user's ear, is covered with a covering member, which is referred to as an end cover 15.

Each of the endpieces 16 is a connecting member for connecting a corresponding eyepiece part 11 and a corresponding temple 14. Each of the endpieces 16 is provided in a region along an outer edge of the eyepiece part 11. Each of the endpieces 16 can be integrated with a corresponding rim 12 or can be independently connected to the eyepiece part.

Each of the hinges 17 is an opening/closing member for allowing a corresponding temple 14 to be folded towards the eyepiece parts 11 and other members. Each of the hinges 17 is provided between a corresponding endpiece 16 and a corresponding temple 14.

Each of the pads 18 is a member to contact the nose of a user.

Each of the pad arms 19 is a connecting member connecting a corresponding pad 18 to a corresponding eyepiece part 11. The pad arms 19 connect, via the rims 12 or directly, the pads 18 to the eyepiece parts 11 such that the pads 18 and the eyepiece parts 11 are located in respective predetermined positions. The glasses-type radio communication device 1 does not necessarily have to include the pad arms 19. In such a case, the pads 18 can be directly connected to the eyepiece parts 11 or the rims 12.

The above-described components may be made of materials identical to those for typical glasses. Note, however, that Embodiment 1 is not limited to this. Examples of a material for the rims 12, the bridge 13, and the temples 14 include, but are not limited to, metals (such as titanium, titanium alloys, aluminum alloys, magnesium alloys, nickel-chromium alloys, and stainless steel) and plastic (such as epoxy resin, celluloid, acetate, and polyamide).

(Configuration of Glasses-Type Radio Communication Device 1)

Figure 1:
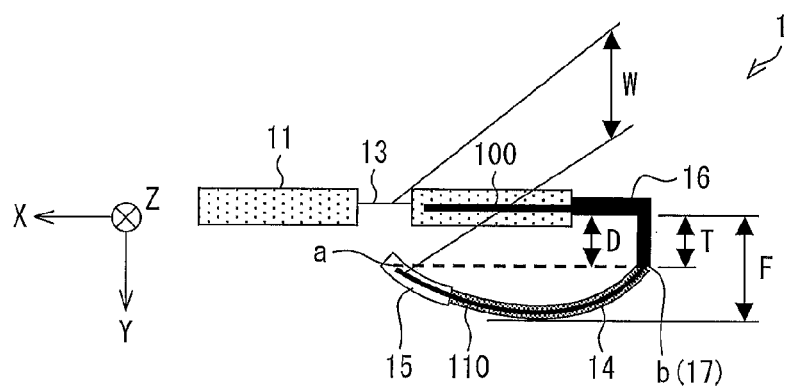
FIG. 1 is a top view illustrating an example of a configuration of a glasses-type radio communication device.

Next, a configuration of the glasses-type radio communication device 1 will be described below with reference to FIGS. 1 and 2. FIG. 1 is a top view illustrating the glasses-type radio communication device 1 which is in a folded state (a temple 14 and a corresponding eyepiece part 11 are close to each other) (folded state). (a) of FIG. 2 is a perspective view illustrating the glasses-type radio communication device 1 which is in an opening state (the temple 14 and the corresponding eyepiece part 11 are away from each other) (opening state). (b) of FIG. 2 is a perspective view illustrating the glasses-type radio communication device 1 which is in a folded state. Note that, for convenience, a temple 14 on a left side is not illustrated. Note also that FIGS. 1 and 2 deal with a glasses-type radio communication device which includes no rim 12. Note, however, that Embodiment 1 is not limited to this. The glasses-type radio communication device can be configured so as to include rims 12.

The glasses-type radio communication device 1 includes an antenna 100 and an antenna 110 each carrying out a radio communication (see FIG. 2). As illustrated in FIG. 2, the antenna 100 is provided in an outer edge region along an outer edge of one of the eyepiece parts 11, which region is located on an upper part of the eyepiece part 11. The antenna 110 is provided in a corresponding one of the temples 14. An endpiece 16 and a hinge 17 are each made of an electric conductor such as metal. The antenna 100 and the antenna 110 are electrically connected with each other, via the endpiece 16 and the hinge 17. Note that the outer edge of the eyepiece part 11 indicates an outer edge of a surface which faces an eye of a user. Note also that the endpiece 16 and the hinge 17 do not necessarily have to electrically connect the antenna 100 and the antenna 110.

The temple 14 is provided so as to curve along a circle between (i) one end of the temple 14 on an endpiece 16 side (a part connected to the endpiece 16, i.e., the hinge 17) and (ii) the other end of the temple 14 which is opposite to the end on the endpiece 16 side (an end of the end cover 15 which is opposite to the other end on a hinge 17 side) such that the temple 14 is away from the antenna 100 in a folded state (see FIG. 1). Specifically, as illustrated in FIG. 1, the temple 14 is provided so as to form a convex curve towards a Y axis positive direction from segment ab, where (i) an end a is the end of the end cover 15 which is opposite to the other end on the hinge 17 side, (ii) an end b is the end of the temple 14 on the endpiece 16 side, and (iii) the segment ab is a line connecting the end a and the end b. That is, the temple 14 is provided so as to form a convex curve from the eyepiece part 11 towards a user (the Y axis positive direction). This satisfies D<F, where D is a distance between the antenna 100 and the segment ab and F is the distance between the antenna 100 and a position of the temple 14 which is farthest from the eyepiece part 11.

Further, as illustrated in FIG. 1, the endpiece 16 of the glasses-type radio communication device 1 has a depth (length in a Y axis direction) of T. Since a distance W, secured between the end cover 15 and the eyepiece part 11 in a folded state, is determined by the depth of the endpiece 16, W=T. Note that the depth T of the endpiece 16 is the same as the distance D which is the distance between the antenna 100 and the segment ab. Therefore, T=D.

(Capacity Coefficient of Glasses-Type Radio Communication Device 1)

Next, a capacity coefficient of the glasses-type radio communication device will be described below with reference to FIG. 4. FIG. 4 is an XY plan view of the glasses-type radio communication device 1 illustrated in FIG. 1. Note that, for convenience, the end cover 15 is not illustrated in FIG. 4.

As shown by arrows in FIG. 4, electric field in the glasses-type radio communication device 1 is small at both ends of the temple 14 and large at around the center part of the temple 14. The electric field in the glasses-type radio communication device 1 is thus not uniform. Therefore, a capacity coefficient C of the antenna 100 and the antenna 110 cannot be found by the foregoing equation (1).

In view of the circumstances, an average distance D' is found. The average distance D' is, as illustrated in FIG. 4, an average of a distance between the antenna 110 (the temple 14) itself and points on the antenna 100 (the eyepiece part 11).

In a case where a shape of the temple 14 is represented as y=f(x), an area S of a region, which is surrounded by the endpiece 16, the temple 14, and the antenna 100, can be represented as the following equation:

$$S=\int_0^L f(x)dx$$

Note that "L" of the above equation represents a length of an overlapping part in which the antenna 100 and the antenna 110 overlap in a folded state (amount of overlapping of the antenna 100 and the antenna 110 in an X axis direction).

The average distance D' can be represented as D'=S/L. Note here that the average distance D' needs to be longer than the distance D for the purpose of reducing the capacity coefficient C between the antenna 100 and the antenna 110. Thus, D'>D. That is, in the glasses-type radio communication device 1, each of the temples 14 needs to be provided so as to have a shape which satisfies D'>D.

By thus providing the temples 14, it is possible to reduce, in a folded state, the capacity coefficient C of the glasses-type radio communication device 1. As such, it is possible to reduce, in a folded state, the amount of capacitive coupling between the antennas of the glasses-type radio communication device 1. This allows a reduction in amount of shift, which amount is generated by the shifting of antenna characteristics of the respective antennas toward a lower frequency or a higher frequency as compared with that in an opening state. It is therefore possible to prevent a deterioration in antenna characteristics of the antennas 100 and 110 in use frequency bands of the respective antennas 100 and 110, when the glasses-type radio communication device 1 is in a folded state.

The above description has discussed an example where the antenna 100 is provided on the upper part of the eyepiece part 11 (see FIG. 2). Note, however, that the provision of the antenna 100 is not limited to this. Alternatively, the antenna 100 can be provided on a lower part of the eyepiece part 11 or on a surface (lens surface) of the eyepiece part 11 which surface faces the eye of a user. Alternatively, the antenna 100 can be provided on a surface of the eyepiece part 11 which surface is opposite to the surface facing the user (outer lens surface). Note that, in a case where the antenna 100 is provided on the lens surface or on the outer lens surface, the antenna 100 is preferably made of a material such as a transparent electric conductor or a translucent material. In a case where a rim surrounds the eye piece part 11, the antenna 100 can be provided (i) between the eyepiece part 11 and the rim 12 (ii) inside of the rim 12, or (iii) outside of the rim 12. It is thus only necessary that the antenna 100 of Embodiment 1 is provided along the outer edge of the eyepiece part 11, and a material for the antenna 100 and a surface, on which the antenna 100 is provided, are therefore not particularly limited.

The above description has dealt with an example in which the glasses-type radio communication device 1, illustrated in FIGS. 1 and 2, includes the antenna 100 and the antenna 110. Note, however, that the configuration of the glasses-type radio communication device 1 is not limited to this. That is, it is only necessary that one of the antenna 100 and the antenna 110 is included. In this case, it is preferable that one of the outer edge of the eyepiece part 11 and the temple 14 in which no antenna 100 or no antenna 110 is provided, is made of an electric conductor such as a metal.

Specifically, in a case where the antenna 100 is provided in the rim 12 or on the lens, the temple 14 is preferably made of an electric conductor. Alternatively, in a case where the antenna 110 is provided in the temple 14, the glasses-type radio communication device 1 preferably includes the rim 12 which is made of an electric conductor. In these cases, an antenna and the electric conductor can make electric connection or no electric connection with each other, via the endpiece 16 or the hinge 17.

In a case where (i) an antenna is thus provided in one of the temple 14 or the rim 12 (the outer edge of the eyepiece part 11) and (ii) the other is thus made of an electric conductor, the other acts as an antenna ground for the antenna. In a case where the antenna and the antenna ground are caused to be close to each other in the glasses-type radio communication device 1, a problem will be caused that antenna characteristics deteriorate. In order to address such a problem, the temple 14 is preferably provided to satisfy the foregoing inequality D'>D.

This makes it possible to reduce, in a folded state, the capacity coefficient C of the glasses-type radio communication device 1, and ultimately allows a reduction, in a folded state, in amount of capacitive coupling between the antennas of the glasses-type radio communication device 1. This allows a reduction in amount of shift, which amount is generated by the shifting of antenna characteristics of the respective antennas toward a lower frequency or a higher frequency as compared with that in an opening state. It is therefore possible to prevent a deterioration in antenna characteristics of the antennas 100 and 110 in use frequency bands of the respective antennas 100 and 110, when the glasses-type radio communication device 1 is in a folded state.

Modification 1

The above description has dealt with the example in which the temple 14 of the glasses-type radio communication device 1 illustrated in FIG. 1 is provided so as to curve along a circle. Note, however, that the shape of the temple 14 is not limited to this. Alternatively, the temple 14 can be provided so as to be bent like a polygonal line, for example. The following description will discuss, with reference to FIG. 5, a glasses-type radio communication device 5 whose temples 14 are provided so as to be bent like a polygonal line.

FIG. 5 is a view illustrating a configuration of the glasses-type radio communication device 5 in accordance with Modification 1 of Embodiment 1. (a) of FIG. 5 is a perspective view illustrating the glasses-type radio communication device 5 which is in an opening state. (b) of FIG. 5 is a perspective view illustrating the glasses-type radio communication device 5 which is in a folded state. (c) of FIG. 5 is a top view illustrating the glasses-type radio communication device 5 which is in a folded state. Note that members such as eyepiece parts 11, rims 12, a bridge 13, end covers 15, endpieces 16, hinges 17, pads 18, and pad arms 19 each have configurations identical to those illustrated in FIG. 3. Note also that members having functions identical to those of the glasses-type radio communication device 1 illustrated in FIG. 1 are given respective identical reference numerals and their description is omitted. It should be noted that, for convenience, a temple 14 on a left side is not illustrated in FIG. 5. It should be also noted that FIG. 5 will deal with a glasses-type radio communication device in which no rim 12 is included. Note, however, that Modification 1 is not limited to this. Alternatively, a glasses-type radio communication device can be configured to include rims 12.

The glasses-type radio communication device 5 includes an antenna 100 and an antenna 110 each carrying out a radio communication (see FIG. 5). The antenna 100 is provided in an outer edge region along an outer edge of one of the eyepiece part 11, which region is located on an upper part of the eyepiece part 11. The antenna 110 is provided in a corresponding one of temples 14'. An endpiece 16 is made of an electric conductor such as metal. The antenna 100 and the antenna 110 are electrically connected with each other, via the endpiece 16. Note that the endpiece 16 and a hinge 17 do not necessarily have to electrically connect the antenna 100 and the antenna 110.

The temple 14' is provided so as to be bent between (i) one end of the temple 14' on an endpiece 16 side (a part connected to the endpiece 16, i.e., the hinge 17) and (ii) the other end of the temple 14 which is opposite to the end on the endpiece 16 side (an end of the end cover 15 which is opposite to the other end on a hinge 17 side) such that the temple 14' is away from the antenna 100 in a folded state (see (c) of FIG. 5). Specifically, the temple 14' is bent so as to protrude towards a Y axis positive direction from segment ab, where (i) an end a is the end of the end cover 15 which is opposite to the other end on the hinge 17 side, (ii) and end b is the end of the temple 14 on the endpiece 16 side, and (iii) the segment ab is a line connecting the end a the end b. This satisfies D<F, where D is a distance between the antenna 100 and the segment ab and F is the distance between the eyepiece part 11 and a position of the temple 14' which is farthest from the antenna 100.

By thus providing the temples 14', it is possible to reduce, in a folded state, a capacity coefficient C of the glasses-type radio communication device 5. As such, it is possible to reduce, in a folded state, the amount of capacitive coupling between the antennas of the glasses-type radio communication device 5. This allows a reduction in amount of a shift, which amount is generated by the shifting of antenna characteristics of the respective antennas toward a lower frequency or a higher frequency as compared with that in an opening state. It is therefore possible to prevent a deterioration in antenna characteristics of the antennas 100 and 110 in use frequency bands of the respective antennas 100 and 110, when the glasses-type radio communication device 5 is in a folded state.

Note that the temple 14 and the temple 14' are not limited to be shaped to have an arc shape as illustrated in FIG. 1 and a bent shape like a polygonal line as illustrated in FIG. 5, respectively. The temple 14 and the temple 14' can have any shape, provided that they are curved so as to be away from the antenna 100 (the outer edge of the eyepiece part 11).

Modification 2

The foregoing description has discussed the example in which, in the folded state of the glasses-type radio communication device 1 illustrated in FIG. 1, the distance W between the end cover 15 and the antenna 100 is equal to the depth T of the endpiece 16. Note, however, that the distance between the end cover 15 and the antenna 100 is not limited to this. Alternatively, the distance W between the end cover 15 and the antenna 100 can be shorter than the depth T of the endpiece 16 (W<T).

FIG. 6 is a top view illustrating a configuration of a glasses-type radio communication device 6 in a folded state. Note that members such as eyepiece parts 11, rims 12, a bridge 13, temples 14, end covers 15, endpieces 16, hinges 17, pads 18, and pad arms 19 each have configurations identical to those illustrated in FIG. 3. Note also that members having functions identical to those of the glasses-type radio communication device 1 illustrated in FIG. 1 are given respective identical reference numerals and their description is omitted. It should be noted that, for convenience, a temple 14 on a left side is not illustrated in FIG. 6.

The glasses-type radio communication device 6 includes an antenna 100 and an antenna 110 each carrying out a radio communication (see FIG. 6). The antenna 100 is provided in an outer edge region along an outer edge of one of the eyepiece part 11, which region is located on an upper part of the eyepiece part 11. The antenna 110 is provided in a corresponding one of the temples 14. An endpiece 16 is made of an electric conductor such as metal. The antenna 100 and the antenna 110 are electrically connected with each other, via the endpiece 16. Note that the endpiece 16 and a hinge 17 do not necessarily have to electrically connect the antenna 100 and the antenna 110.

The temple 14 is provided so as to curve along a circle such that the temple 14 is away from the antenna 100 in a folded state (see FIG. 6). The temple 14 is provided so as to form a convex curve towards a Y axis positive direction from segment ab, where the segment ab is a line which is parallel to the antenna 100 and passes an end b, which is one end of the temple 14 on the endpiece 16 side. That is, D<F where D is a distance between the antenna 100 and the segment ab and F is a distance between the antenna 100 and a position of the temple 14 which is farthest from the eyepiece part 11. Since the distance D is equal to the depth T of the endpiece 16, D=T.

Note that the end cover 15 is provided such that a distance between (i) its end opposite to the other end on an endpiece 16 side and (ii) the antenna 100 is shorter than a depth of the endpiece 16. Specifically, the end cover 15 is provided so that W<T, where W is the distance between the end cover 15 and the antenna 100 in a folded state.

An average distance D' can be represented, as explained with reference to FIG. 4, as D'=S/L, where D' is a distance between the antenna 100 and the antenna 110, that is, an average of a distance between points on an outer edge region of the eyepiece part 11 and the temple 14 itself. Here, as shown in FIG. 4, S is an area of a region surrounded by the endpiece 16, the temple 14, and the antenna 100, and L is a length of an overlapping part in which the antenna 100 and the antenna 110 overlap when the glasses-type radio communication device 6 is in a folded state (amount of overlapping of the antenna 100 and the antenna 110 in an X axis direction).

The average distance D' needs to be longer than the distance D for the purpose of reducing a capacity coefficient C between the antenna 100 and the antenna 110. Thus, D'>D. That is, in the glasses-type radio communication device 6, each of the temples 14 needs to be provided so as to have a shape which satisfies D'>D.

Even though the glasses-type radio communication device 6 is configured such that a distance between the end cover 15 (temple 14) and the antenna 100 is shorter than a depth of the endpiece 16, it is possible to reduce the capacity coefficient C of the glasses-type radio communication device 6 in a folded state, by providing the temple 14 such that an average of a distance between (i) respective points on the antenna 100 and (ii) respective points on the temple 14 is longer than a distance between an end of the temple 14 on the endpiece 16 side and the eyepiece part 11 (a depth of the endpiece 16). It is therefore possible to prevent a deterioration in antenna characteristics of the antennas 100 and 110 in use frequency bands of the respective antennas 100 and 110, when the glasses-type radio communication device 6 is in a folded state.

Modification 3

The foregoing description has discussed the example in which, in the folded state of the glasses-type radio communication device 6 illustrated in FIG. 6, the distance W between the end cover 15 and the antenna 100 is equal to the depth T of the endpiece 16. Note, however, that the distance W between the end cover 15 and the antenna 100 can be longer than the depth T of the endpiece 16 (W>T).

FIG. 7 is a top view illustrating a configuration of a glasses-type radio communication device 7 in a folded state. Note that members such as eyepiece parts 11, rims 12, a bridge 13, temples 14, end covers 15, endpieces 16, hinges 17, pads 18, and pad arms 19 each have configurations identical to those illustrated in FIG. 3. Note also that members having functions identical to those of the glasses-type radio communication device 1 illustrated in FIGS. 1 through 3 are given respective identical reference numerals and their description is omitted. It should be noted that, for convenience, a temple 14 on a left side is omitted in FIG. 7.

The glasses-type radio communication device 7 includes an antenna 100 and an antenna 110 each carrying out a radio communication (see FIG. 7). The antenna 100 is provided in an outer edge region along an outer edge of one of the eyepiece parts 11, which region is located on an upper part of the eyepiece part 11. The antenna 110 is provided in a corresponding one of the temples 14. An endpiece 16 is made of an electric conductor such as metal. The antenna 100 and the antenna 110 are electrically connected with each other, via the endpiece 16. Note also that the endpiece 16 and a hinge 17 do not necessarily have to electrically connect the antenna 100 and the antenna 110.

The temple 14 is provided so as to curve along a circle such that the temple 14 is away from the antenna 100 in a folded state (see FIG. 7). The temple 14 is provided so as to form a convex curve towards a Y axis positive direction from segment ab, where the segment ab is a line which is parallel to the antenna 100 and passes an end b, which is one end of the temple 14 on the endpiece 16 side. That is, D<F where D is a distance between the antenna 100 and the segment ab and F is a distance between the antenna 100 and a position of the temple 14 which is farthest from the eyepiece part 11. Since the distance D is equal to the depth T of the endpiece 16, D=T.

Note that the end cover 15 is provided such that a distance between (i) its end opposite to the other end on an endpiece 16 side and (ii) the eyepiece part 11 is longer than a depth of the endpiece 16. Specifically, the end cover 15 provided so that W>T, where W is the distance between the end of the end cover 15 and the eyepiece part 11 in a folded state.

An average distance D' can be represented, as explained with reference to FIG. 4, as D'=S/L, where D' is a distance between the antenna 100 and the antenna 110, that is, an average of distance between points on an outer edge region of the eyepiece part 11 and the temple 14 itself. Here, as shown in FIG. 4, S is an area of a region surrounded by the endpiece 16, the temple 14, and the antenna 100, and L is a length of an overlapping part in which the antenna 100 and the antenna 110 overlap when the glasses-type radio communication device 7 is in a folded state (amount of overlapping in an X axis direction).

As illustrated in FIG. 7, the average distance D' is longer than the distance D in the glasses-type radio communication device 7. That is, D'>D. According to the glasses-type radio communication device 7, which is configured such that a distance between the end cover 15 (temple 14) and the antenna 100 is longer than the depth of the endpiece 16, the temple 14 is provided such that an average of a distance between (i) respective points on the antenna 100 and (ii) respective points on the temple 14 is longer than a distance between an end of the temple 14 on an endpiece 16 side (the hinge 17) and the eyepiece part 11 (the depth of the endpiece 16) it is possible to reduce a capacity coefficient C of the glasses-type radio communication device 7 in a folded state. It is therefore possible to prevent a deterioration in antenna characteristics of the antennas 100 and 110 in use frequency bands of the respective antennas 100 and 110, when the glasses-type radio communication device 7 is in a folded state.

As has been described, a glasses-type radio communication device is a glasses-type radio communication device to be worn on the head of a user, including: left and right eyepiece parts 11; temples 14 each provided to be hooked on the ears of the user; an antenna 100 or 110 for carrying out a radio communication; and hinges 17 each provided for folding each of the temples 14 towards a corresponding one of the eyepiece parts 11. Here, each of the hinges 17 is located at an end of a corresponding temple 14 on an endpiece 16 side and is a mechanism for folding the temple 14 towards the corresponding eyepiece part 11. Note that the hinges 17 can be made of an electric conductor so as to electrically connect the endpiece 16 and the temple 14. Either (i) an antenna is provided in an outer edge region along an outer edge of one of the eyepiece parts 11 (for example, a rim 12) and an antenna is provided in a corresponding one of the temples 14 (the antenna 100 and the antenna 110 are provided) or (ii) an antenna (the antenna 100 or the antenna 110) is provided in one of (a) the outer edge region along the outer edge of the eyepiece part 11 and (b) the temple 14, whereas an electric conductor is provided in the other. While the temple 14 is being folded towards the eyepiece part 11, the temple 14 has a shape in which the temple 14 curves so as to be away from the antenna 100 or the electric conductor provided in the outer edge region.

According to the glasses-type radio communication device including the antenna, each of (i) the outer edge region along the outer edge of the eyepiece part 11 and (ii) the temple 14 is provided with the antenna or the electric conductor. Hence, in a case where a radio communication is carried out while the temple 14 is being folded towards the eyepiece part 11, (i) the antenna 100 or the electric conductor provided in the outer edge region along the outer edge of the eyepiece part 11 and (ii) the temple 14, interfere with each other and are capacitively coupled with each other.

However, with the configuration, the temple 14 is provided to have a shape in which it curves so as to be away from the outer edge region. This allows an increase in distance between the temple 14 and the outer edge region, as compared with a case where the temple 14 is not curved. This makes it possible to reduce the amount of capacitive coupling. Accordingly, it is possible to reduce an amount of shift of antenna characteristics towards a lower frequency or a higher frequency, as compared with that in a state where the eyepiece part 11 and the temple 14 are away from each other (in a state where the eyepiece part 11 and the temple 14 are not folded). This makes it possible to prevent, while the temple 14 is being folded towards the eyepiece part 11, a deterioration in antenna characteristics in a use frequency band of the antenna(s) of the glasses-type radio communication device.

Note that the term "curve" in this specification means "bow". Examples of the term encompass a curved line and a polygonal line.

The glasses-type radio communication device according to the present embodiment is preferably configured such that an average distance (an average distance D'), indicative of an average of a distance between (i) the temple 14 itself and (ii) points on the antenna 100 or the electric conductor provided in the outer edge region, is longer than a distance D between a corresponding one of the hinges 17 (an end of the temple 14 on the endpiece 16 side) and the antenna 100 or the electric conductor provided in the outer edge region (D'>D).

With the configuration, it is possible to reduce the amount of capacitive coupling between (i) the temple 14 and (ii) the antenna 100 or the electric conductor provided in the outer edge region, as compared with the amount of capacitive coupling, in a case where the temple 14 is provided such that the average distance, which is an average of a distance between the temple 14 itself and points on the antenna 100 or the electric conductor, is equal to the distance between (i) the hinge 17 and (ii) the antenna 100 or the electric conductor provided in the outer edge region (that is, in a case where the temple 14 is provided to satisfy D=D'). This makes it possible to more suitably prevent, while a temple is being folded towards the eyepiece part 11, a deterioration in antenna characteristics in a use frequency band of the antenna of the glasses-type radio communication device.

Further, the temple 14 is preferably configured such that, while the temple 14 is being folded towards the corresponding one of the eyepiece parts 11, the temple 14 has the shape in which the temple curves in such a direction as to extend from the corresponding one of the eyepiece parts towards the user.

With the configuration, it is possible to increase, while the temple 14 is being folded towards the eyepiece part 11, a distance between (i) the temple 14 and (ii) the antenna 100 or the electric conductor provided in an outer edge region along the outer edge of the eyepiece part 11. This makes it possible to reduce, while the temple 14 is being folded towards the eyepiece part 11, the amount of capacitive coupling between the temple 14 and the antenna 100 or the electric conductor provided in the outer edge region. Accordingly, it is possible to more suitably prevent a deterioration in antenna characteristics in a use frequency band of the antenna of the glasses-type radio communication device.

While the temple 14 is being folded towards the eyepiece part 11, the distance D between the hinge 17 and the antenna 100 can be, (i) shorter than the distance W between one end of the temple 14 opposite to the other end on a hinge 17 side (the end a in FIG. 11 and the antenna 100, like the glasses-type radio communication device 7, (ii) equal to the distance W, like the glasses-type radio communication device 1 in FIG. 1, or (iii) longer than the distance W, like the glasses-type radio communication device 6 in FIG. 6.

Even though the end of the temple 14 opposite to the other end on the hinge 17 side is provided so as to be located in any position, it is possible to more suitably prevent a deterioration in antenna characteristics, by providing the temple 14 to have a shape in which it curves so as to be away from the antenna 100 provided in the outer edge region.

Embodiment 2

Embodiment 1 has discussed a case where the temple 14 is provided so as to curve, in a folded state, in such a direction as to extend from the antenna 100 towards a user. Note, however, that the glasses-type radio communication device of the present invention is not limited to this. Alternatively, the temple 14 can be provided so as to curve, for example, in a Z axis direction in FIG. 1.

Another embodiment (Embodiment 2) of the present invention will be described below with reference to FIG. 8. Note that, for convenience, members having functions identical to those illustrated in the drawings for Embodiment 1 are given respective identical reference numerals and their description is omitted. Note also that members such as eyepiece parts 11, rims 12, a bridge 13, temples 14, end covers 15, endpieces 16, hinges 17, pads 18, and pad arms 19 have configurations identical to those illustrated in FIG. 1.

(Configuration of Glasses-Type Radio Communication Device 8)

Next, a configuration of a glasses-type radio communication device 8 will be described below with reference to FIG. 8. (a) of FIG. 8 is a front perspective view illustrating the glasses-type radio communication device 8 in a case where it is in an opening state (opening state) (a temple 14 and a corresponding eyepiece part 11 are away from each other). (b) of FIG. 8 is a perspective view illustrating the glasses-type radio communication device which is viewed, in an opening state, from a side opposite to that of (a) of FIG. 8 (viewed in a Y axis positive direction), that is, a perspective view which is viewed from a user's side. (c) of FIG. 8 is a front view illustrating the glasses-type radio communication device 8 which is viewed, in a folded state (in a state where the temple 14 and the corresponding eyepiece part 11 are close to each other), from the user's side (viewed in the Y axis positive direction) (folded state). Note that, for convenience, the other temple 14 is not illustrated in FIG. 8. Note also that FIG. 8 deals with a glasses-type radio communication device in which the rims 12 are provided on an upper part of the eyepiece parts 11. Note, however, that Embodiment 2 is not limited to this. Alternatively, the glasses-type radio communication device can be configured so as to (i) include rims 12 provided on respective outer edges of the eyepiece parts 11 or (ii) include no rim 12.

The glasses-type radio communication device 8 includes an antenna 100 and an antenna 110 each carrying out a radio communication (see FIG. 8). As illustrated in FIG. 8, the antenna 100 is provided in a rim 12 which is on an upper part of the eyepiece part 11. The antenna 110 is provided in the temple 14. An endpiece 16 is made of an electric conductor. The antenna 100 and the antenna 110 are electrically connected with each other, via the endpiece 16. Note that the endpiece 16 and a hinge 17 do not necessarily have to electrically connect the antenna 100 and the antenna 110.

The temple 14 is provided so as to curve along a circle between (i) one end of the temple 14 on an endpiece 16 side (a part connected to the endpiece 16, i.e., the hinge 17) and (ii) the other end of the temple 14 which is opposite to the end on the endpiece 16 side (an end of an end cover 15 which is opposite to the other end on a hinge 17 side) such that the temple 14 is away from the antenna 100 in a folded state (see (c) of FIG. 8). Specifically, the temple 14 is provided to satisfy D<F (see FIG. 8) where D is a distance between a part that connects the temple 14 to the endpiece 16 (an end of the temple 14 on the endpiece 16 side) and the antenna 100 and F is a distance between the antenna 100 and a position of the temple 14 which is farthest from the antenna 100.

An average distance D' can be represented, as explained with reference to FIG. 4, as D'=S/L, where D' is a distance between the antenna 100 and the antenna 110, that is, an average of a distance between points on an outer edge region of the eyepiece part 11 and the temple 14 itself. Here, S is an area of a region surrounded by the endpiece 16, the temple 14, and the antenna 100, and L is a length of an overlapping part in which the antenna 100 and the antenna 110 overlap when the glasses-type radio communication device 8 is in a folded state (amount of overlapping of the antenna 100 and the antenna 110 in an Z axis direction).

The average distance D' needs to be longer than the distance D for the purpose of reducing a capacity coefficient C between the antenna 100 and the antenna 110. Thus, D'>D. That is, in the glasses-type radio communication device 8, each of the temples 14 needs to be provided so as to have a shape which satisfies D'>D.

Embodiment 2 has discussed the example in which the temple 14 is provided so as to curve, in a folded state, downward of the eyepiece part 11 from the antenna 100 (in a Z axis positive direction). Note, however, that Embodiment 2 is not limited to this. Alternatively, the temple 14 can be provided so as to curve, in a folded state, upward of the eyepiece part 11 from the antenna 100 (in a Z axis negative direction). For example, in a case of a glasses-type radio communication device in which rims 12 each of which is provided on a lower part of a corresponding eyepiece part 11 are included and an antenna 100 is provided in one of the rims 12, the temple 14 can be provided so as to (i) curve, in a folded state, upward of the eyepiece part 11 from the antenna 100 (in the Z axis negative direction) or (ii) curve, in a folded state, downward of the eyepiece part 11 from the antenna 100 (in the Z axis positive direction) in a folded state.

Note, however, that a shift amount of antenna characteristics can be more reduced, by providing the temple 14 in such a direction (in the Z axis positive direction in the case of FIG. 8) that the antenna 100 curves towards a region where no antenna or no electric conductor is provided (the lower part of the eyepiece part 11 in the case of FIG. 8)

The glasses-type radio communication device 8 in accordance with Embodiment 2 can be configured so that (i) an outer edge region (the rim 121 of the eyepiece part 11 includes a region where no antenna 100 or no electric conductor is provided and (ii) the temple 14 is provided in such a direction as to curve, while the temple 14 is being folded towards the eyepiece part 11, from the region, in which the antenna 100 of or the electric conductor of the rim 12 is provided, towards the region in which no antenna 100 or no electric conductor is provided (in the Z axis positive direction in the case of FIG. 8).

This makes it possible to reduce a capacity coefficient C of the glasses-type radio communication device 8 in a folded state. It is therefore possible to suitably prevent a deterioration in antenna characteristics of the antennas 100 and 110 in use frequency bands of the respective antennas 110 and 110, when the glasses-type radio communication device 8 is in a folded state.

Note that Embodiment 2 has dealt with an example in which the temple 14 is provided so as to curve, in a folded state, in the Z axis positive direction, in a case where the antenna 100 is provided on the upper side of the rim 12. However, the temple 14 is not limited to this. Alternatively, for example, the temple 14 can be provided so as to incline from the Z axis positive direction towards a user (in a Y axis positive direction). That is, it is only necessary that the temple 14 is provided, in a folded state, in such a direction as to be away from the region, in the outer edge region, where the antenna or the conductor is provided. This makes it possible to suitably prevent a deterioration in antenna characteristics in the use frequency bands of the respective antennas of the glasses-type radio communication device 8.

SUMMARY

As has been described, a glasses-type radio communication device in accordance with the present invention is a glasses-type radio communication device to be worn on the head of a user, including: left and right eyepiece parts; temples each provided to be hooked on the ears of the user; an antenna(s) for carrying out a radio communication; and hinges each provided for folding each of the temples towards a corresponding one of the eyepiece parts, either (i) an antenna being provided in an outer edge region along an outer edge of one of the eyepiece parts and an antenna being provided in a corresponding one of the temples or (ii) an antenna being provided in one of (a) the outer edge region along the outer edge of the eyepiece part and (b) the temple, whereas an electric conductor being provided in the other, while the temple is being folded towards the eyepiece part, the temple having a shape in which the temple curves so as to be away from the antenna or the electric conductor provided in the outer edge region.

According to the eyeglasses-type radio communication device including the antenna, each of (i) the outer edge region along the outer edge of the eyepiece part and (ii) the temple is provided with the antenna or the electric conductor. Hence, in a case where a radio communication is carried out while the temple is being folded towards the eyepiece part, (i) the antenna or the electric conductor provided in the outer edge region along the outer edge of the eyepiece part and (ii) the temple, interfere with each other and are capacitively coupled with each other.

However, with the configuration, the temple is provided to have a shape in which it curves so as to be away from the outer edge region. This allows an increase in distance between the temple and the outer edge region, as compared with a case where the temple is not curved. This makes it possible to reduce the amount of capacitive coupling. Accordingly, it is possible to reduce an amount of shift of antenna characteristics towards a lower frequency or a higher frequency, as compared with that in a state where the eyepiece part and the temple are away from each other (in a state where the eyepiece part and the temple are not folded). This makes it possible to prevent, while the temple is being folded towards the eyepiece part, a deterioration in the antenna characteristics in a use frequency band of the antenna(s) of the glasses-type radio communication device.

The glasses-type radio communication device is preferably configured such that an average distance, indicative of an average of a distance between (i) the temple itself and (ii) points on the antenna or the electric conductor provided in the outer edge region, is longer than a distance between a corresponding one of the hinges and the antenna or the electric conductor provided in the outer edge region.

With the configuration, it is possible to reduce the amount of capacitive coupling between (i) the temple and (ii) the antenna or the electric conductor provided in the outer edge region, as compared with the amount of capacitive coupling, in a case where the temple is provided such that the average distance, which is an average of a distance between the temple itself and points on the antenna or the electric conductor, is equal to the distance between (i) the hinge 17 and (ii) the antenna 100 or the electric conductor provided in the outer edge region. This makes it possible to more suitably prevent, while the temple is being folded towards the eyepiece part, a deterioration in antenna characteristics in a use frequency band of the antenna of the glasses-type radio communication device.

The glasses-type radio communication device is preferably configured such that, while the temple is being folded towards the corresponding one of the eyepiece parts, the temple has the shape in which the temple curves in such a direction as to extend from the corresponding one of the eyepiece parts towards the user.

With the configuration, it is possible to increase, while the temple is being folded towards the eyepiece part, a distance between (i) the temple and (ii) the antenna, or the electric conductor provided in an outer edge region along the outer edge of the eyepiece part. This makes it possible to reduce, while the temple is being folded towards the eyepiece part, the amount of capacitive coupling between the temple and the antenna or the electric conductor provided in the outer edge region. Accordingly, it is possible to more suitably prevent a deterioration in antenna characteristics in a use frequency band of the antenna of the glasses-type radio communication device.

The glasses-type radio communication device can be configured such that the outer edge region includes a region in which no antenna or no electric conductor is provided, and the temple has a shape in which it curves, while the temple is being folded towards the eyepiece part, in such a direction as to extend from the region, in which the antenna or the electric conductor in the outer edge region is provided, towards the region in which no antenna or no electric conductor is provided.

By thus providing the temple, while the temple is being folded towards the eyepiece part, in such a direction as to be away from the region, in the outer edge region, where the antenna or the conductor is provided, it is possible to suitably prevent a deterioration in antenna characteristics in a use frequency band of the antenna of the glasses-type radio communication device.

The glasses-type radio communication device can be configured such that, while the temple is being folded towards the eyepiece part, the distance between the hinge and the antenna or the electric conductor provided in the outer edge region is (a) shorter than, (b) equal to, or (c) longer than a distance between (i) an end of the temple which end is opposite to its other end on a hinge side and (ii) the antenna or the electric conductor provided in the outer edge region.

Even though the end of the temple opposite to the other end on the hinge side is provided so as to be located in any position, it is possible to more suitably prevent a deterioration in antenna characteristics, by forming the temple to have a shape in which it curves so as to be away from the antenna or the electric conductor provided in the outer edge region.

The present invention is not limited to the descriptions of the respective embodiments, but may be altered within the scope of the claims. An embodiment derived from a proper combination of technical means disclosed in different embodiments is also encompassed in the technical scope of the present invention.

INDUSTRIAL APPLICABILITY

The present invention is applicable to the field of manufacturing a product such as a pair of three dimensional eyeglasses, a pair of eyeglasses for games, a head mount display, a headset, a radio receiver, or a personal identification device.

REFERENCE SIGNS LIST 1, 5, 6, 7, 8 Glasses-type radio communication device
11 Eyepiece part
12 Rim
13 Bridge
14, 14' Temple
15 End cover
16 Endpiece
17 Hinge
18 Pad
19 Pad arms
100 Antenna
110 Antenna

The invention claimed is:

1. A glasses-type radio communication device to be worn on the head of a user, comprising:
    left and right eyepiece parts;
    temples each provided to be hooked on the ears of the user;
    an antenna(s) for carrying out a radio communication; and
    hinges each provided for folding each of the temples towards a corresponding one of the eyepiece parts,
        either (i) an antenna being provided in an outer edge region along an outer edge of one of the eyepiece parts and an antenna being provided in a corresponding one of the temples or (ii) an antenna being provided in one of (a) the outer edge region along the outer edge of the eyepiece part and (b) the temple, whereas an electric conductor being provided in the other,
        while the temple is being folded towards the eyepiece part, the temple having a shape in which the temple curves so as to be away from the antenna or the electric conductor provided in the outer edge region.

2. The glasses-type radio communication device as set forth in claim 1, wherein:
    an average distance, indicative of an average of a distance between (i) the temple itself and (ii) points on the antenna or the electric conductor provided in the outer edge region, is longer than a distance between a corresponding one of the hinges and the antenna or the electric conductor provided in the outer edge region.

3. The glasses-type radio communication device as set forth in claim 1 wherein:
    while the temple is being folded towards the corresponding one of the eyepiece parts, the temple has the shape in which the temple curves in such a direction as to extend from the corresponding one of the eyepiece parts towards the user.

4. The glasses-type radio communication device as set forth in claim 1, wherein:
    the outer edge region includes a region in which no antenna or no electric conductor is provided, and
    the temple has a shape in which it curves, while the temple is being folded towards the eyepiece part, in such a direction as to extend from the region, in which the antenna or the electric conductor in the outer edge region is provided, towards the region in which no antenna or no electric conductor is provided.

5. The glasses-type radio communication device as set forth in claim 1, wherein:
    while the temple is being folded towards the eyepiece part, the distance between the hinge and the antenna or the electric conductor provided in the outer edge region is shorter than a distance between (i) an end of the temple which end is opposite to its other end on a hinge side and (ii) the antenna or the electric conductor provided in the outer edge region.

6. The glasses-type radio communication device as set forth in claim 1, wherein:
    while the temple is being folded towards the eyepiece part, the distance between the hinge and the antenna or the electric conductor provided in the outer edge region is equal to or longer than the distance between (i) an end of the temple which end is opposite to its other end on a hinge side and (ii) the antenna or the electric conductor provided in the outer edge region.

7. The glasses-type radio communication device as set forth in claim 2 wherein:

while the temple is being folded towards the corresponding one of the eyepiece parts, the temple has the shape in which the temple curves in such a direction as to extend from the corresponding one of the eyepiece parts towards the user, the outer edge region includes a region in which no antenna or no electric conductor is provided, the temple has a shape in which it curves, while the temple is being folded towards the eyepiece part, in such a direction as to extend from the region, in which the antenna or the electric conductor in the outer edge region is provided, towards the region in which no antenna or no electric conductor is provided, and while the temple is being folded towards the eyepiece part, the distance between the hinge and the antenna or the electric conductor provided in the outer edge region is shorter than a distance between (i) an end of the temple which end is opposite to its other end on a hinge side and (ii) the antenna or the electric conductor provided in the outer edge region.

8. The glasses-type radio communication device as set forth in claim 2 wherein:

while the temple is being folded towards the corresponding one of the eyepiece parts, the temple has the shape in which the temple curves in such a direction as to extend from the corresponding one of the eyepiece parts towards the user, the outer edge region includes a region in which no antenna or no electric conductor is provided, the temple has a shape in which it curves, while the temple is being folded towards the eyepiece part, in such a direction as to extend from the region, in which the antenna or the electric conductor in the outer edge region is provided, towards the region in which no antenna or no electric conductor is provided, and while the temple is being folded towards the eyepiece part, the distance between the hinge and the antenna or the electric conductor provided in the outer edge region is equal to or longer than the distance between (i) an end of the temple which end is opposite to its other end on a hinge side and (ii) the antenna or the electric conductor provided in the outer edge region.

* * * * *